March 17, 1936. E. ALTENKIRCH Re. 19,889

ABSORPTION REFRIGERATING SYSTEM

Original Filed June 8, 1929

Edmund Altenkirch.
Inventor

Harry S. Bunnell
Attorney

Reissued Mar. 17, 1936 Re. 19,889

UNITED STATES PATENT OFFICE 19,889

ABSORPTION REFRIGERATING SYSTEM

Edmund Altenkirch, Neuenhagen, near Berlin, Germany, assignor, by mesne assignments, to The Hoover Company, North Canton, Ohio, a corporation of Ohio Original No. 1,887,957, dated November 15, 1932, Serial No. 369,358, June 8, 1929. Application for reissue September 28, 1934, Serial No. 745,929. In Germany June 16, 1928

47 Claims. (Cl. 62—119.5)

This invention relates to absorption refrigerating systems and more particularly to systems using inert gas.

Absorption systems in which inert gas is employed in the evaporator and the absorber are known. One form of such systems is that in which a resorber is employed instead of a condenser.

In accordance with the present invention, a resorption system is so arranged as to cause inert gas to circulate through parts of the system other than the evaporator and absorber.

In the copending application for the reissue of applicant's Patent No. 1,887,909, resorber systems in which inert gas is circulated through a generator are disclosed and particularly claimed. The present case is more concerned with systems in which inert gas is circulated through a resorber, although certain of the claims are generic to the features of Patent 1,887,909.

Under certain conditions, it is desirable to operate an absorption refrigerating system with the boiler and resorber at a relatively low temperature. This is advantageous where high temperatures may cause corrosion or where a cheap source of low temperature heat is available. It is one object of the invention to provide a system capable of operating under these conditions, although it may result, in certain instances, in a decrease in the thermal operating efficiency from that which could be obtained were the boiler and resorber operated at higher temperatures.

It is another object of the invention to provide an arrangement for improving the capacity, efficiency, quantity of heat input or other operating characteristics of a resorption refrigerating system. As will be explained hereinafter, certain desired results may be brought about by the use of multi-stage devices for carrying out the evaporation, absorption, generation or resorption steps inherent in every resorption refrigeration process.

In accordance with the present invention, an absorption refrigerating system may be freed from several limitations to which absorption apparatus which use a neutral or inert gas are subject. The system can be adapted readily to a great variety of requirements in practice. While in the prior art absorption devices, the absorption solution from which the operating medium or refrigerant, is evaporated into the neutral gas, has a concentration range different from the absorption solution by which the operating medium is absorbed from the gas mixture, the present arrangement may use an absorption solution of the same concentration range for both steps, provided the temperature range and the refrigerant partial pressure zone are different for the two steps.

The presence of neutral gas in the resorber has the effect that the temperature range within which the absorption heat of the resorber is liberated is not only dependent upon the pressure and the change in concentration, as is the case in all resorption systems, but also upon the quantity of the neutral gas circulating through the resorber. Therefore, this temperature range can be varied within very wide limits by correspondingly regulating the amount of the gas circulation. If the mean temperature of the resorber is not much higher than that of the evaporator in which the absorption colution enriched in the resorber is re-evaporated, and if only a comparatively small amount of absorption solution is allowed to circulate between the resorber and the evaporator, the resorber may be included in the circuit of the neutral gas between the evaporator and the absorber, preferably with the gas mixture discharged from the evaporator traversing first the resorber and then the absorber. The gas mixture circulation can in such a case be brought about with well known means, so that additional means for effecting the neutral gas circulation through the resorber are not necessary.

The further range of use, the advantages and additional new features involved in the invention will be more fully described in the following specification with reference to the accompanying drawing in which a number of different arrangements according to the invention are shown, partly only schematically, and partly in a form approaching that of a practical form.

In all figures of the drawings, it is clearly shown how the different vessels involved in the system are connected by liquid and gas conduits.

In the drawings,

Fig. 1 schematically illustrates an absorption system in which one absorber and one evaporator are connected by an inert gas circuit, and one resorber and one generator are connected by another inert gas circuit;

Figure 4:
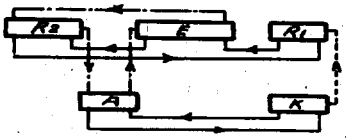

Fig. 4 schematically shows an absorption refrigerating system having a generator, two resorbers, one evaporator and one absorber, and in which the evaporator is connected with the two resorbers in one circuit for the absorption solution, and the absorber, the evaporator and one of the two resorbers, are connected by an inert gas circuit.

Figure 6:
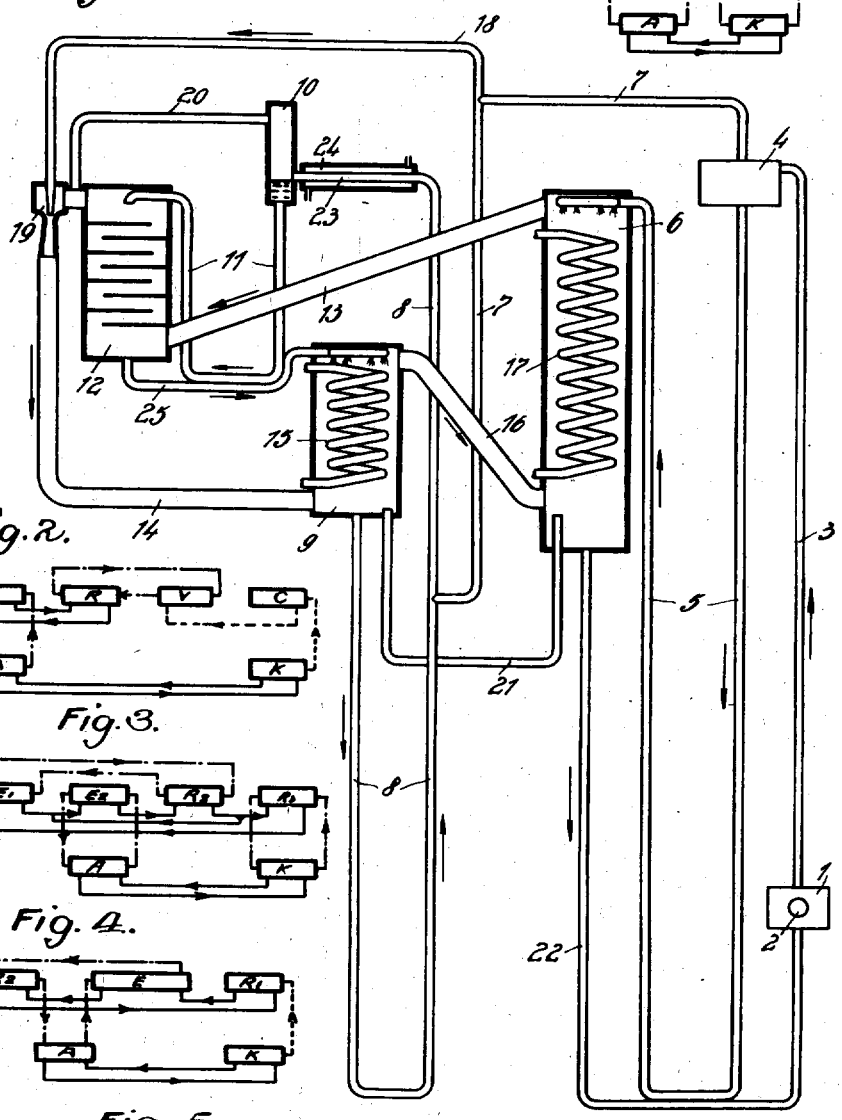
Figure 5:
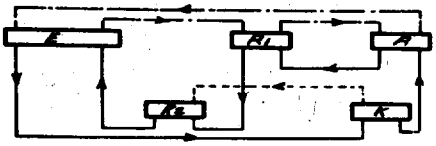

Fig. 5 schematically shows an absorption refrigerating system which contains the same kind and number of vessels as Fig. 4, in which however certain vessels are combined to form one single liquid circulating system, but in which, as in Fig. 4, the absorber, the evaporator and one of the resorbers, are connected by a single inert gas circuit; and Fig. 6 shows the absorption refrigerating system shown in Fig. 4 in an arrangement in which the different vessels and their connections approach more closely the practical form of such a machine.

In the purely schematic illustrations Figs. 1 to 5, the liquid conduits are represented by solid lines, the pure gaseous refrigerant conduits by dotted lines, and the inert gas circuit by dash and dot lines.

Figure 1:
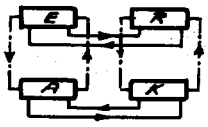

The principle involved in the present invention can be explained in very simple manner with the aid of schematic illustration Fig. 1.

Referring to this figure the reference letter K indicates the generator, A the absorber, R the resorber and E the evaporator. The direction of flow is shown by arrow heads. As solvent may, for instance be assumed sulphuric acid, as refrigerant for working medium water and as inert gas in the generator and resorber nitrogen and in the evaporator and the absorber hydrogen. The sulphuric acid absorption solution extensively freed from the water, in flowing from the generator K to the absorber A, interchanges its heat with the solution enriched by working medium flowing from the absorber to the generator. The enriched solution flowing from the resorber to the evaporator is likewise in heat interchange with the solution returning from the evaporator to the absorber. The indication of the heat interchange in the circulation systems of the gas mixture has been omitted in the drawings for the sake of simplification.

Such a system operates in the following manner. By the application of heat to the watery sulphuric acid solution in the generator K steam is developed and discharged into the admixed nitrogen. The sulphuric acid concentrated by the evaporation then reaches the absorber A. The nitrogen, heated by the contact with the solution in the generator and having also become lighter by having taken up steam, ascends into the resorber R located at a higher level. There it gives off the steam to the sulphuric acid solution coming from the evaporator. The heat of absorption is discharged by cooling water or air. The gas mixture more or less freed of steam returns to the generator, and the sulphuric acid diluted by the absorption of water vapor passes into the evaporator E, where it gives off the steam to the admixed hydrogen under a corresponding production of cold. The hydrogen gas mixture thus becomes heavier and sinks down into the absorber A, where the steam is absorbed by the sulphuric acid coming from the generator K, heat being set free, and discharged to cooling water or air. The hydrogen gas mixture freed of steam and heated in the absorber ascends again to the evaporator. The solutions and the gas mixtures flow in opposite directions in all of the vessels.

The total pressure may be different or the same in the two gas mixture circulating systems. If the total pressure is different, this difference in pressure may be maintained by liquid columns. For instance, in case a lower pressure in the absorber is desired, it would be placed higher than the generator, and in case a lower pressure is desired in the evaporator, it would be placed higher than the resorber. The entire system may be simplified if the same kind of neutral or inert gas is used in the two gas circuits, and if the total pressure is maintained equal. The gas mixture circulation in each of the two systems may be maintained with well known means and without difficulty.

Systems of the type described are entirely free from any restriction in regard to the choice of the pressure. Those with sulphuric acid as solvent and water as working medium may be operated with a total pressure of 0.1 or 0.2 atmosphere absolute, or at atmospheric pressure, or at a pressure above atmospheric, and without any moving parts or great heights of structures. For the greatest economy an increase in pressure is required.

Thus in Figure 1 the refrigerant is absorbed from the inert gas by the solution in the resorber R at the partial pressure determined by its temperature and re-evaporated from the solution in the same concentration range into the inert gas in evaporator E in a zone of low refrigerant partial pressure. The gas generated in the generator K is introduced into inert gas mixture at a refrigerant pressure corresponding with the zone of refrigerant partial pressure of the resorber R. The scope of utility of the invention is increased, if a third (higher) pressure or partial pressure zone is provided, at which the refrigerant or working medium is evaporated and condensed. The condensation may take place in this zone of highest pressure either by pure condensation or by absorption in a solution, and this pressure zone may or may not be maintained by inert gas.

Figure 2:
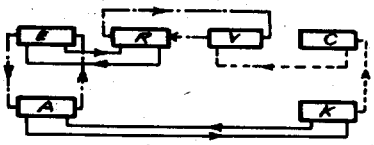
Fig. 2 shows schematically an absorption refrigerating system in which the refrigerant vapor developed in the generator passes first into a condenser, and the condensate passes into a primary evaporator, and in which this primary evaporator and a resorber on one hand, and the absorber and a secondary evaporator on the other hand, are combined into two separate inert gas circuits.

By the addition of the third pressure zone various substantial improvements are attained, which will now be described with reference to the remaining diagrams. Referring first to Fig. 2, one of these improvements consists in deriving the working medium, not from the generator K, but from a primary evaporator V charged with the condensate of the higher pressure stage and in which it has already produced cold once, so that the working medium generated by a definite expenditure of heat in the generator produced cold twice. The refrigerating capacity of the machine can thus be increased considerably.

The resorber solution then performs a cycle, in which it passes in succession into the temperature range of the production of cold (evaporator E) and into the temperature range of the heat discharge to the surroundings (resorber R), while coming twice in contact with the neutral gas, and this is a dominant characteristic of the present invention.

The working medium, Figures 2 to 6, is assumed to be ammonia and the solvent water.

In Figure 2 the ammonia is generated in the generator K by the application of heat and passes into the condenser C. It is there condensed under discharge of heat and then passes (dashed line) into the primary evaporator V, where it evaporates into the gas mixture circulating (dash-dot line) between the resorber R and the primary evaporator V under production of cold in the latter. From the gas mixture the working medium is again absorbed in the resorber R, under renewed discharge of absorption heat by the resorber. The solution thus enriched circulates between the secondary evaporator E and the resorber R. In evaporator E it is, under renewed production of cold, evaporated into the gas mixture circulating between the evaporator E and the absorber A. Finally it is again absorbed in the absorber A from the latter gas mixture by the solution circulating between the generator K and the absorber A under discharge of heat from the absorber.

Thus the arrangement of Figure 2 consists of two stages of evaporation and accordingly may be referred to as a multi-stage system. In both evaporators, (V and E) the refrigerant evaporates into inert gas. Two separate independent inert gas circuits balance the differences in refrigerant partial pressure between the high (generator K and condenser C) intermediate (evaporator V and resorber R) and low (evaporator E and absorber A) sides of the system.

Compared with a single stage absorption system having a condenser and using inert gas in the evaporator and absorber, it may be said that the arrangement of Figure 2 consists of such a system with the addition of the resorber R and the evaporator E. At no additional expense, as regards heat input in the boiler, and without causing the boiler to operate at a higher temperature, the refrigerant generated in the boiler is caused to evaporate twice and be absorbed twice before returning to the boiler.

It is not necessary that the solution, as assumed in the examples mentioned, return immediately from the chamber, in which it has absorbed working medium from a gas mixture, into the chamber in which the absorbed working medium again evaporates from the same concentration range of the solution into gas mixture. It is quite possible and assists in the simplification of the circulation of the liquid to pass the liquid from the absorption or resorption chamber in a medium partial pressure zone into a chamber in which it continues to absorb working medium within the same temperature range, but at higher pressure or partial pressure. The strongly concentrated solution may then pass into the chamber where it gives up working medium to gas mixture in a range of low temperature and in the medium partial pressure zone, and finally pass to the chamber, where it gives off further working medium to inert gas in the concentration range corresponding with the gas absorption in the first chamber. More generally expressed the cycles of circulation of the liquids may be so combined, that all three partial pressure zones are traversed by the solution which circulates between two temperature ranges.

Figure 3:
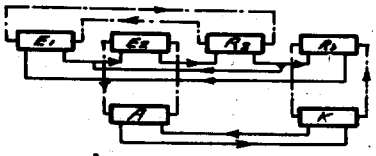
Fig. 3 shows schematically an absorption refrigerating system having a generator, an absorber, and two resorbers, and two evaporators, and in which one resorber is connected with the generator, the other resorber with one of the two evaporators, and the other evaporator with the absorber, each of the aforementioned pairs of vessels having separate inert gas circuits.

Fig. 3 of the drawings show an example of this system. Fig. 3 also differs from Fig. 2 in the use of a second resorber (R), instead of a condenser and in the addition of a third inert gas circuit between the generator and the second resorber. The refrigerant pressure in the boiler K and resorber R, is high, that in the evaporator E, and resorber $R_2$ intermediate and that in the evaporator $E_2$ and absorber A low. Ammonia is assumed to be used as working medium, water as solvent and nitrogen as inert gas in all three gas cycles of circulation. The gas circulation systems may be equalized in pressure by interconnecting means. In the drawings these interconnections have again been omitted for the sake of simplicity. The ammonia expelled in the generator K by the application of heat passes by the agency of a gas circulation into the resorber $R_1$. In the latter the working medium is absorbed by a solution, which first passes into the evaporator $E_1$, which by a gas circulation system communicates with the resorber $R_2$. The working medium converted into vapor in the evaporator $E_1$ is again absorbed by the solution flowing through the resorber $R_2$. The solution in the latter resorber is able to do this, since after traversing the evaporator $E_1$ it first passes into the evaporator $E_2$, where by means of a gas circulation connected with the absorber A it is freed of gas to a large extent at a low partial pressure, so that it enters the resorber $R_2$ at a low concentration. From the resorber $R_2$ the solution returns into the resorber $R_1$, where it receives ammonia from the generator K.

A pressure may prevail in the entire system considerably lower than that which corresponds with the vapor pressure of the pure ammonia. This pressure may, on the other hand, be substantially exceeded. Particularly when a high pressure prevails it may be necessary to make the quantity of the solution circulating between the resorber $R_1$ and the evaporator $E_1$ smaller than the quantity of solution circulating between the resorber $R_2$ and the evaporator $E_2$. By a branch leading from the pipe connecting resorber $R_2$ and $R_1$, to the pipe which connects evaporators $E_1$ and $E_2$, shown in Fig. 3, this requirement may be met in a simple manner. By this branch a portion of the solution then returns into the evaporator $E_2$ immediately after it leaves resorber $R_2$, while the remaining portion of the solution traverses resorber $R_1$ and the evaporator $E_1$. This remaining portion of the solution thus circulates through all three partial pressure ranges. This branch current may without difficulty be allowed to participate in the heat interchange of the solutions, not shown in these diagrams, but which is preferably provided between the solution which flows from the resorber $R_1$ to the evaporator $E_1$ and that which flows from the evaporator $E_2$ to the resorber $R_2$.

Two of the separate gas cycles in Fig. 3, may be combined into a single gas circuit. A combination of the evaporator $E_1$ with the evaporator $E_2$ is also possible. If the use of inert gas in the high pressure zone is omitted, that is between the generator K and the resorber $R_1$, a particularly simple embodiment of my invention is obtained, which is illustrated in Fig. 4 of the drawings. From the solution circulating between the absorber A and the generator K the ammonia is expelled in the generator K by the application of heat, and passes into the resorber $R_1$, (dotted line) where it is absorbed by a solution, which has already absorbed ammonia from gas mixture in the resorber $R_2$. The solution thus further enriched in the resorber $R_1$ passes into the evaporator E which is shown comparatively long in order to indicate the combination of two evaporators. The solution, after being extensively freed in this evaporator from ammonia which evaporates into the gas mixture coming from the absorber A, now passes into the resorber $R_2$, where it again absorbs ammonia from the gas mixture, and thence returns into the resorber $R_1$, where the further concentration takes place in the absence of inert gas, and commences its cycle anew. The gas mixture arrives in evaporator E from absorber A with low ammonia partial pressure, assumes in the evaporator E an ammonia partial pressure, which when the mixture leaves the evaporator corresponds with that of the intermediate partial pressure zone, and then gives off a portion of its admixed ammonia in the resorber $R_2$ to the solution contained therein and loses the remainder in the absorber A in the low ammonia partial pressure zone. In the absorber A and the resorbers $R_1$ and $R_2$ it is necessary to discharge heat. In the evaporator E the cold is produced.

The apparatus which is only schematically illustrated in Fig. 4 of the drawings, is shown in Fig. 6 in a structural form which approximates, more or less, its actual execution, so far as the relative location of elements and their general structural character and physical connection are concerned. The ammonia, expelled from an aqueous ammonia solution in the generator, boiler or still 1 by means of a heating element 2, ascends in the pipe 3 in gaseous form together with the weak solution into the gas separator or rectifier 4, which is located at such an elevation that the discharge of the solution through the pipe 5 into the absorber 6 commences before the pressure necessary for operating the nozzle 19 exists. The solution returning from the absorber 6 through the pipe 22 to the generator or boiler 1 forms, together with the pipe 5, a heat interchanger. The expelled gaseous ammonia separates in the gas separator 4 from the solution and passes through the pipe 7 into the rising leg of the U-shaped pipe 8 coming from the gas filled resorber 9, terminating in this pipe 8 at a level, which suffices for creating an appreciable liquid head in pipe 8 above this entry point to raise (by the gas from pipe 7) the liquid in pipe 8 in the direction of the arrow, from the level of resorber 9. Also the liquid pressure at this level creates the back pressure necessary for operating nozzle 19.

The gaseous ammonia thus raises the solution coming from the second resorber 9 ($R_2$ in Fig. 4) to the first resorber 23 ($R_1$ in Fig. 4) not participating in the gas mixture circulation, this latter resorber being cooled by cooling jacket 24. The gaseous ammonia thus first raises the solution and is absorbed by this solution when it reaches the resorber 23. The absorption solution enriched in this way passes into the gas separator 10, in which any non-absorbed residues of gas separate from the liquid, and then flows through the pipe 11 into the evaporator 12, in which the cold is generated, the vapor now passing into the circulating gas mixture supplied through pipe 13. The absorption solution, which has been greatly impoverished in the evaporator 12 then flows through a pipe 25, which with the pipe 11 forms a heat interchanger, into the second resorber 9, in which it flows over the pipe coil 15 traversed by cooling water. It is cooled thereby and absorbs ammonia from the circulating gas mixture. This mixture is supplied in counter flow from the evaporator through pipe 14. It is circulated by the gas jet 19 supplied with pure gas through pipe 18 directly from gas separator 4, the jet operating in well known manner. The further concentration of the solution then takes place in the resorber 23, as already described. The gas mixture, partially freed from ammonia in the resorber 9 flows thence through pipe 16 into the absorber 6, in which the absorption solution drips down over the pipe coil 17 traversed by cooling water. The gas mixture ascends in the absorber 6 in counter-flow to the absorption solution and gives up further ammonia to the cooled absorption solution. The gas mixture now flows through the pipe 13 into the evaporator 12, enters at the bottom, and rises in counterflow to the rich solution dripping down in the evaporator, until it is conveyed into the pipe 14 and the cycle is renewed. Pipe 18 which supplies jet 19 with fresh gas branches from pipe 7 at such a height, that when the machine is stopped and a vacuum is set up in the gas separator 4 inert gas is able to return through the nozzle rearwards into the gas separator 4. This prevents liquor returns from the resorber system into the absorber system, which would cause an undesirable extension of the starting time of the machine. Gas residues, which have not been absorbed in the resorber 23, are conducted to the gas mixture pipe 14 through the pipe 20. This is particularly suitable, because this surplus gaseous working medium can thus be absorbed in the resorber 9 and assist in the output of cold. The nozzle 19 is located in the pipe 14 leading from the evaporator to the resorber 9, so that the gas employed for bringing about the gas circulation is not lost for the refrigerating action. Small quantities of the solvent are carried from the absorber system into the resorber system. In order to return these surplus quantities a pipe 21 is provided leading from the resorber 9 into the absorber 6. It would be of advantage to precool the gas mixture flowing through the pipe 13 by the gas mixture flowing in the pipe 14 and this heat interchanger should preferably be located in front of the point of connection of the nozzle 19. For the sake of simplifying the drawings this heat interchanger has been omitted in Fig. 6. For the same reason other improvements known in the art of absorption machines have been omitted, such as rectifiers or analyzers.

The greatest simplification for the liquid circulation occurs, of course, when all cycles of liquid circulation are combined in a single cycle. Fig. 5 of the drawings illustrate schematically such a system designed for an increased cold output without neutral gas admixture in the generator K and resorber $R_2$ of the high partial pressure stage, and with a single gas mixture circulation through the evaporator E, the resorber $R_1$ and the absorber A. The absorption solution flows here from the generator K first to the absorber A, thence into resorber $R_1$, thence into resorber $R_2$, thence into the evaporator E and finally back into the generator K. The generator K and the resorber $R_2$ may without difficulty operate under higher refrigerant pressure than the vessels containing inert gas. Refrigerant gas generated in K flows to the resorber $R_2$. The resorber $R_1$ may operate under an intermediate or mean refrigerant partial pressure while the absorber A operates under a low refrigerant partial pressure. The pressure difference may be maintained by hydrostatic columns and the pressure difference may be utilized to bring about the circulation of the gas mixture by introducing a portion of the gas expelled in the generator K into the pipe leading from the evaporator E into the resorber $R_1$. The absorber A and the resorber $R_1$ may easily be combined into a common vessel. In order that the intended success of the saving of heat may be realized in the practical execution of this refrigerating machine it is necessary to fulfill a number of conditions, disregard of which would render the output of the machine unsatisfactory.

Above all it is necessary to provide an efficient heat interchange between the circulatig absorption solutions and the gas mixture. Care must be taken to cause considerably less solution to circulate through the evaporator E and the two resorbers $R_1$ and $R_2$ than between the generator K and the absorber A. Under certain working conditions it is advantageous to subdivide the solution, which flows through the evaporator E and the resorbers $R_1$ and $R_2$ by means of interconnections so that a smaller quantity circulates within the range of the stronger concentration of the solution. Finally the gas circulation may by transverse connections, be quantitatively adapted to the prevailing demand in the various partial pressure zones. All the necessary sizes and quantities may be calculated from the data available in the literature of the art, so that further explanations appear unnecessary.

From the preceding explanations and the examples illustrated it will be understood that the gas circuits may either individually or in groups be united to a common circuit through various absorption or evaporation chambers. If three pressure zones exist, two inert gas currents are necessary. One circulates between the absorber and one portion of the evaporator, and the other between the other portion of the evaporator and one portion of the resorber. This case is illustrated in Fig. 2 of the drawings. The two separate gas circuits may be combined into a single circuit, which then has two dfferent partial pressure zones, regardless of whether the cycles of liquid circulation are combined or not. This case is illustrated in Figs. 4, 5 and 6.

In the designs according to Figs. 1 and 3 inert gas circulation takes place between a chamber to which heat is supplied at a high temperature and a chamber in which heat is discharged at a medium or intermediate temperature.

For bringing about the desired effect it is not absolutely necessary, that the gas mixture circulate in counter-flow to the solution in all chambers in which the working medium evaporates or is absorbed. The counter-flow brings about a considerable improvement, however, particularly in cases in which the temperature ranges is not extensive, so that it is advisable to make use of it wherever possible.

For satisfactory operation of the system gas circulation is necessary, the amount of circulation being dependent on the liquid circulation and the capacity. The gas may be circulated by any known means.

For the circulation of the absorption solution known means may be employed. Where the generator and resorber contain inert gas the application of these means is, however, rendered somewhat difficult.

Circulation due to the different specific weights of the strong and the weak solution may be used if the pressure in the chambers where working medium under high pressure is absorbed out of the gas mixture, is higher than in the chambers where the working medium again evaporates from the solution into the inert gas, and if this pressure difference is maintained by columns of liquid. Where, however, common gas cycles exist it is not possible to maintain such a pressure difference. To cause the desired circulation it is then possible to connect the individual vessels in which the gas interchange takes place with the solution by a system of pipes, such as U-shaped pipes, which also contain temperature interchangers, and to cause the circulation by heating the solution in the rising leg of the U-shaped pipe, which conveys the solution, for instance, into the chamber, which forms part of the higher temperature range. The heating of the solution in this leg may cause the development of gas from the solution, and the gas so generated may be employed for the operation of a nozzle for starting the gas circulation. In this manner the gas circulation and the liquid circulation may simultaneously be caused in a very effective manner, and the latter may be rendered so efficient, that for the chambers, in which the interchange of the working medium between gas and solution occurs, a pressure head exists.

Although in the examples given three temperature ranges were discussed the improvements described are by no means limited to this number. On the contrary, by maintaining two different evaporation temperatures or heat discharge temperature it is possible to add further temperature ranges. Two evaporator temperatures are advantageous, for example, in refrigerating cabinets, where the cooling of the refrigerating chamber to a temperature between 2° and 4° C. suffices, but for the production of ice a temperature of at least −5° C. must be produced in the evaporator. One evaporator may then operate at −8° C. and the other at 0° C.

If very slight temperature reductions are to be obtained or an extreme reduction of the evaporation temperature, the intended effect may be increased as desired by the addition of further pressure or partial pressure zones, as far as the properties of the absorption solutions permit this.

Various modifications and changes may be made by those skilled in the art without departing from the spirit and the scope of the invention.

I claim as my invention.

1. In an absorption machine of the character described, the process which consists in evaporating the working medium from a portion of an absorption solution of a certan concentration range into an inert gas mixture within a certain temperature range and a first partial pressure zone, and reabsorbing it from said gas mixture by another portion of said absorption solution of the same concentration range as the first portion, but within another temperature range and a second partial pressure zone, and expelling the working medium from a solution and returning it into its liquid phase in a third partial pressure zone, the second partial pressure, at which the working medium is absorbed from gas mixture, by the aforementioned solution portion of equal concentration range, being lower than the third pressure at which the working medium is expelled and returned to its liquid phase, but higher than the first partial pressure at which the working medium evaporates from the first-mentioned solution portion into the gas mixture.

2. In an absorption machine of the character described and in which heat is applied to an enriched absorption solution in a high and a low temperature range and discharged within a medium temperature range, the process which consists in evaporating the working medium from a portion of an absorption solution into a neutral gas mixture within a certain temperature range and a first partial pressure zone, and reabsorbing it from said gas mixture by another portion of said absorption solution of the same concentration range but within another temperature range and a second partial pressure zone, and expelling the working medium from a solution and returning it into its liquid phase in a third partial pressure zone, the second pressure at which the working medium is absorbed from the gas mixture by the aforementioned solution portion of equal concentration range being lower than the third pressure at which the working medium is expelled and returned to its liquid phase, but higher than the first partial pressure at which the working medium evaporates from the first-mentioned solution portion into the gas mixture, the two solution portions of equal concentration range performing a cycle of circulation in which they pass successively through the low and the medium temperature range.

3. In an absorption machine involving a cycle of generation, resorption, evaporation into an inert gas and absorption, the method of setting the gas mixture in circulation through the evaporator, the resorber and the absorber, by introducing into it working medium generated at a higher pressure.

4. In an absorption machine involving a cycle of generation, resorption, evaporation into an inert gas and absorption, the method of setting the gas mixture in circulation through the evaporator, the resorber and the absorber, by introducing working medium developed at a higher pressure into the connecting pipe between the evaporator and the resorber in a direction in which the resulting motion of the gas mixture occurs in the direction from the evaporator toward the resorber.

5. In an absorption process involving operating stages of gas generation, resorption, evaporation into an inert gas and absorption therefrom, two separate gas mixture cycles within some of the aforementioned operating stages, and the maintenance of the pressure difference between such mixture cycles by means of hydrostatic columns.

6. In an absorption process involving operating stages of gas generation, resorption, evaporation into an inert gas and absorption therefrom, two separate gas mixture cycles within some of the aforementioned operating stages and the maintenance of the pressure difference between such mixture cycles by means of hydrostatic columns, the same inert gas being admixed in said mixture cycles.

7. In an absorption machine containing a working medium, an absorption solution for said medium and an inert gas not absorbable by said solution, and comprising a generator for developing gaseous medium from solution of a certain concentration range, a resorber having a gas connection with said generator and containing solution of another concentration range and in which the gaseous medium generated in said generator is absorbed, an evaporator having a liquid conduit connection with said resorber to permit the evaporation of gaseous medium in the evaporator from the solution of the second named concentration range, an absorber having gas connections with said evaporator and having means for receiving lean solution for absorbing gaseous medium delivered from said evaporator to form a solution of the first named concentration range, whereby a closed cycle of circulation of the said medium is formed, connecting pipes between said generator and said absorber for permitting the absorption solution of the first-mentioned concentration range to circulate, additional circulating pipe connections between said resorber and said evaporator permitting circulation of solution of the second named concentration range between said two vessels, the evaporation of gaseous medium from absorption solution of the second named concentration range and the absorption of gaseous medium into absorption solution of the first named concentration range occurring in the presence of the said inert gas into which the medium evaporates in said evaporator and from which it separates in said absorber, whereby the development of gaseous medium from absorption solution of at least a portion of one of the two solutions of different concentration range occurs in the presence of inert gas within a certain temperature range and in a certain zone of the partial pressure of said medium in mixture with said inert gas, and whereby the absorption of the gaseous medium in absorption solution of at least one part of the solution of the same concentration range, following said development of gaseous medium, occurs likewise in the presence of inert gas but within another temperature range and another partial pressure zone of said medium, the gaseous medium developed from absorption solution in the generator being under a vapor pressure higher than the pressure in said two partial pressure zones.

8. In an absorption machine containing a working medium, an absorption solution for said medium and an inert gas not absorbable by said solution, and comprising a generator for developing gaseous medium from solution of a certain concentration range, a resorber having a gas connection with said generator and containing solution of another concentration range and in which the gaseous medium generated in said generator is absorbed, an evaporator having a liquid conduit connection with said resorber to permit the evaporation of gaseous medium in the evaporator from solution of the second named concentration range, an absorber having gas connections with said evaporator and having means for receiving lean solution for absorbing gaseous medium delivered from said evaporator to form a solution of the first named concentration range, whereby a closed cycle of circulation of the said medium is formed, connecting pipes between said generator and said absorber for permitting the absorption solution of the first-mentioned concentration range to circulate, additional circulating pipe connections between said resorber and said evaporator permitting circulation of solution of the second named concentration range between said two vessels, the evaporation of gaseous medium from absorption solution of the second named concentration range and the absorption of gaseous medium into absorption solution of the first-mentioned concentration range occurring in the presence of said inert gas into which the medium evaporates in said evaporator and from which it separates in said absorber, whereby the development of gaseous medium from absorption solution of at least a portion of one of the two solutions of different concentration range occurs in the presence of inert gas within a certain temperature range and in a certain zone of the partial pressure of said medium in mixture with said inert gas, and whereby the absorption of the gaseous medium in absorption solution of at least one part of the solution of the same concentration range, following said development of gaseous medium, occurs likewise in the presence of inert gas but within another temperature range an another partial pressure zone of said medium, the development of gaseous medium from absorption solution of the first concentration range and its subsequent return to its liquid phase occurring at temperatures other than those prevailing in said aforementioned two temperature ranges.

9. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring respectively into and out of said inert gas, and the absorption of the gaseous medium occurring in at least one of said resorber sections also in the presence of inert gas.

10. In an absorption machine containing a working medium an absorption solution for said medium, an an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between said second resorber section and at least one of the other vessels in which absorption solutions come in contact with said inert gas, for permitting circulation of the inert gas through said vessels.

11. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connecting with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator.

12. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evapoation of said medium in the evaporator and its absorption in said absorber occurring into, respectively out of said inert gas, and the absorption of the gaseous medium occurring in said second resorber section also in the presence of inert gas, and gas conduit connections between said second resorber section and said evaporator and said absorber for permitting circulation of the inert gas through said vessels, the absorption in the first absorber section by solution of the second named concentration range occurring in the absence of inert gas.

13. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator, and means for effecting the circulation of said inert gas.

14. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator, and means for effecting the circulation of said inert gas, comprising a gaseous medium supply line carrying a pressure higher than that in the circuit carrying the inert gas, said supply line having a nozzle terminating in one of the gas mixture conduits for setting the gas mixture in motion.

15. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas for permitting circulation of the inert gas through said resorber section and the evaporator, and a pipe connection for conducting pure gaseous medium developed by said generator, at a pressure and temperature higher than those prevailing in the gas mixture circuit, into said mixture circuit, said pipe connection having a nozzle terminating in one of said gas mixture conduits for setting the gas mixture in motion.

16. In an absorption machine containing a working medium, an absorption solution for said medium, and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator, and a pipe connection for conducting pure gaseous medium developed by said generator, at a pressure and temperature higher than those prevailing in the gas mixture circuit, into said mixture circuit, said pipe connection having a nozzle terminating in the gas mixture conduit at the point where the mixture emanates from the evaporator, whereby the gas mixture is set in motion in the direction toward the second resorber section and the pure gas supplied by said pipe is admixed to the gas mixture and returned into the cycle of the operating medium through the evaporator and the two resorber sections, and the absorber.

17. In an absorption process involving operating stages of gas generation, resorption, evaporation into an inert gas and absorption therefrom, two separate gas mixture cycles within some of the aforementioned operating stages, one of said mixture cycles including the evaporation stage and the absorption stage, and the other gas mixture cycle including the resorption stage and one of the other operating stages.

18. In an absorption process involving operating stages of gas generation, resorption, evaporation into an inert gas and absorption therefrom, two separate gas mixture cycles within some of the aforementioned operating stages, one of said mixture cycles including the evaporation stage and the absorption stage, and the other gas mixture cycle including the resorption stage and one of the other operating stages, each of the mixtures in the two gas mixture cycles containing inert gas.

19. In an absorption machine involving a cycle of the working medium through a generation stage, a resorption stage, an evaporation stage and absorption stage, a cycle of absorption liquid through said resorption stage and said evaporation stage and a cycle of an inert gas through said resorption stage and at least one of the working medium developing stages; the stage of the process which consists in circulating the gas mixture during the resorption stage in counterflow to the absorption liquid.

20. In an absorption machine containing a working medium, an absorption solution for said medium and an inert gas not absorbable by said solution, and comprising a generator for developing gaseous medium from solution of a certain concentration range, a resorber divided into two separate sections connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said generator and an ascending part of said liquid circulating conduit, to permit the lifting of said second range solution to said first-named resorber section by means of gas bubbles developed in said generator, an absorber having gas connections with said evaporator and having means for receiving lean solution for absorbing the gaseous medium delivered from said evaporator to form a solution of the first-named concentration range, whereby a closed cycle of circulation of said medium is formed, connecting pipes between said generator and said absorber for permitting solution of the first-mentioned concentration range to circulate between the generator and the absorber, the evaporation of said medium in said evaporator and its absorption in said absorber occurring into, respectively out of said inert gas, and the absorption of the gaseous medium occurring in the second-named resorber section also in the presence of inert gas.

21. In an absorption machine of the character described, the process which consists in evaporating the working medium from a portion of an absorption solution of a certain concentration range into an inert gas mixture within a certain temperature range and a first partial pressure zone, and reabsorbing it from said gas mixture by another portion of said absorption solution of the same concentration range as the first portion, but within another temperature range and a second partial pressure zone, and expelling the working medium from a solution and returning it into its liquid phase in a third partial pressure zone and within a third temperature range, the second partial pressure, at which the working medium is absorbed from gas mixture by the aforementioned solution portion of equal concentration range, being lower than the third pressure at which the working medium is expelled and returned to its liquid phase, but higher than the first partial pressure at which the working medium evaporates from the first-mentioned solution portion into the gas mixture.

22. In a continuous absorption refrigerating system using an inert gas, the combination of a number of inter-connected vessels, including an evaporator, an absorber, a generator and a plurality of devices for changing refrigerant from a gaseous phase to a more dense fluid phase, and means for circulating inert gas through the evaporator, the absorber and one of said devices.

23. In a continuous absorption refrigerating system, inter-connected vessels forming a high refrigerant pressure side of the system, interconnected vessels including a plurality of evaporators forming a low refrigerant pressure side of the system, means for circulating inert gas through the vessels constituting the low pressure side of the system and means for circulating inert gas through the vessels constituting the high pressure side of the system.

24. In a continuous absorption refrigerating system, an evaporator, an absorber, a generator, a resorber and means for circulating inert gas between the generator and resorber.

25. In a continuous absorption refrigerating system, an evaporator, an absorber, a resorber and means for circulating inert gas in a single circuit through said evaporator, absorber and resorber.

26. In a continuous absorption refrigerating system, an evaporator, an absorber, two resorbers and means for maintaining inert gas in one of said resorbers.

27. In a continuous absorption refrigerating system, an evaporator, an absorber, two resorbers and means for maintaining inert gas in both of said resorbers.

28. In a multi-stage continuous absorption refrigerating system, the combination of a generator, an absorber, a plurality of evaporators, a plurality of resorbers and means for maintaining inert gas in said evaporators and in at least one of said resorbers.

29. In a multi-stage continuous absorption refrigerating system, the combination of a first evaporator, a second evaporator, a resorber, a condenser, an absorber, a generator, means for circulating inert gas between the first mentioned evaporator and the resorber, means for circulating inert gas between the second mentioned evaporator and the absorber, means for circulating solution between the resorber and the second mentioned evaporator, means for circulating solution between the absorber and the generator, means for conveying refrigerant gas from the generator to the condenser and means for conveying liquid refrigerant from the condenser to the first mentioned evaporator.

30. In continuous absorption refrigerating apparatus using inert gas, a multi-stage evaporation system comprising a plurality of evaporators having inert gas therein, an equal number of absorbing devices having inert gas therein for absorbing refrigerant gas evolved in the evaporators, and inert gas and absorption liquid circulating means so connected to said evaporators and devices as to enable refrigerant to pass through said evaporators and devices alternately in series and evaporate into inert gas in each evaporator and be absorbed out of inert gas in each absorbing device.

31. In a continuous absorption refrigerating system using inert gas and arranged to operate on the usual continuous absorption refrigeration cycle in which a refrigerant passes through the steps of evaporation, absorption, generation and change from a gaseous phase to a more dense fluid phase, a multi-stage device for carrying out one of the steps of said cycle and comprising a plurality of inter-connected vessels adapted to operate at different refrigerant pressures and means providing independent inert gas circuits through said vessels for maintaining different refrigerant pressures in said vessels.

32. In an absorption process for producing refrigeration, the steps of evaporating refrigerant, absorbing it, generating it from solution and changing it from a gaseous phase to a more dense fluid phase, one of said steps being carried out successively in a plurality of stages at different refrigerant pressures while maintaining the difference in pressure between the stages at least partially by circulating inert gas in a plurality of cycles.

33. In an absorption process for producing refrigeration, the steps of evaporating refrigerant, absorbing it, generating it from solution and changing it from a gaseous phase to a more dense fluid phase, said last mentioned step being carried out in a plurality of stages in the presence of an inert gas.

34. The absorption process of continuously producing refrigeration which comprises a cycle which includes the steps of heating a solution of absorbent and refrigerant to expel the refrigerant in gaseous phase, cooling the gaseous refrigerant so formed to change it to a more dense fluid phase, conveying the refrigerant in the more dense fluid phase into the presence of an inert gas to cause it to evaporate to produce a cooling effect, conveying the mixture of inert gas and refrigerant gas into the presence of an absorbent, cooling the gases and absorbent to cause the absorbent to absorb the refrigerant, conveying the solution thus obtained again into the presence of an inert gas to cause the refrigerant to again evaporate and again produce a cooling effect, again conveying the mixture of inert gas and refrigerant gas into the presence of absorbent, cooling the mixture and absorbent to cause the refrigerant to again be absorbed and again heating the solution so formed to complete the cycle.

35. An absorption refrigerating system including a generator, an absorber, a plurality of evaporators and a resorber for each evaporator, means for circulating solution between each evaporator and its resorber and means for circulating inert gas through the evaporators.

36. An absorption refrigerating system including a resorber, two evaporators, means for circulating solution through said resorber and said evaporators, two separate inert gas circuits, one for each of said evaporators, and means for maintaining a difference in the refrigerant partial pressures in the two evaporators.

37. In a continuous absorption refrigerating system an evaporator, two resorbers, an absorber, means for circulating solution through said resorbers and said evaporator in series and means for circulating inert gas through said evaporator, said absorber and one of said resorbers in series.

38. In a continuous absorption refrigerating system of the type in which an inert gas is employed, a generator, a resorber, an evaporator, an absorber, means for causing a refrigerant to pass through said elements in the order named, means for circulating inert gas through said evaporator and said absorber and means for causing the resorber to operate over a different range of solution concentration than the range in said evaporator.

39. In a continuous absorption refrigerating system of the type in which an inert gas is employed, a generator, a resorber, an evaporator, an absorber, means for causing a refrigerant to pass through said elements in the order named, means for circulating inert gas through said evaporator and said absorber and means for causing the resorber to operate over a different range of solution concentration than the range in said evaporator, said last mentioned means including a second evaporator, a second resorber and an arrangement for circulating inert gas between them.

40. An absorption machine for the production of heat of high temperature, containing a generator, an absorber, an evaporator and a resorber, connecting pipes between said vessels to permit circulation of absorption solution through them, the gaseous working medium in said vessels having an indifferent gas admixed to it, and further connecting pipes between the said vessels to permit circulation of indifferent gas through said generator, resorber, absorber and evaporator.

41. A continuous absorption refrigerating system including a generator, an absorber, an evaporator, a device for changing gaseous refrigerant to a more dense fluid phase and means for circulating inert gas between said evaporator and said device.

42. A continuous absorption refrigerating system having a number of interconnected elements including a boiler, a condenser, a first evaporator, a resorber, a second evaporator, an absorber, means for causing refrigerant to pass in a cycle through said elements in the order recited and means for circulating inert gas through certain of said elements.

43. In a continuous absorption refrigerating system, means for causing refrigerant to pass in a continuous cycle through a number of interconnected vessels and means for causing the refrigerant to be evolved from a liquid as a gas and then changed from its gaseous phase to a more dense fluid phase, successively, in one vessel after another, at least three times, said last mentioned means using inert gas.

44. A heat transfer process which includes the steps of causing a working medium to pass in a continuous cycle through a number of interconnected vessels, applying heat to certain of said vessels, cooling others of said vessels and circulating inert gas through certain of said vessels to cause the working medium to be evolved from a liquid, as a gas and then changed from its gaseous phase to a more dense fluid phase, successively at least three times.

45. In a continuous absorption refrigerating system, an evaporator, a plurality of resorbers, a generator, an absorber and means for circulating inert gas through one of said resorbers and said evaporator.

46. In a continuous absorption refrigerating system, an evaporator, a plurality of resorbers, a generator, an absorber, means for circulating inert gas through certain of said vessels and means for circulating absorption solutions in series through two resorbers and said evaporator.

47. In a continuous absorption refrigerating system using inert gas, a generator for expelling refrigerant from an absorption solution, an absorber, means for circulating inert gas through the absorber, means for passing refrigerant expelled in the generator directly to said absorber, means for circulating absorption solution through said absorber to cause the refrigerant delivered thereto from the generator to be absorbed in the absorber and means for causing the generator to operate over a different solution concentration range than that over which the absorber operates.

EDMUND ALTENKIRCH.